United States Patent
Ahuja et al.

(10) Patent No.: US 12,547,443 B2
(45) Date of Patent: Feb. 10, 2026

(54) METHOD AND SYSTEM FOR AUTOMATICALLY PROVIDING A PROCESS COMPLETION INFORMATION OF AN APPLICATION PROCESS

(71) Applicant: JPMorgan Chase Bank, N.A., New York, NY (US)

(72) Inventors: Sahil Ahuja, Chandigarh (IN); Rupesh Kumar, Bengaluru (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 472 days.

(21) Appl. No.: 18/101,407

(22) Filed: Jan. 25, 2023

(65) Prior Publication Data

US 2024/0184617 A1    Jun. 6, 2024

(30) Foreign Application Priority Data

Dec. 1, 2022   (IN) .............................. 202211069518

(51) Int. Cl.
*G06F 11/30* (2006.01)
*G06F 9/48* (2006.01)
*G06F 11/32* (2006.01)

(52) U.S. Cl.
CPC .............. *G06F 9/48* (2013.01); *G06F 9/4806* (2013.01); *G06F 9/4843* (2013.01); *G06F 9/4881* (2013.01); *G06F 11/30* (2013.01); *G06F 11/3072* (2013.01); *G06F 11/3086* (2013.01); *G06F 11/323* (2013.01)

(58) Field of Classification Search
CPC ........ G06F 9/48; G06F 9/4806; G06F 9/4843; G06F 9/4881; G06F 11/30; G06F 11/3003; G06F 11/3072; G06F 11/3086; G06F 11/323; G06F 11/3475; G06N 20/00
See application file for complete search history.

(56) References Cited

U.S. PATENT DOCUMENTS

| | | | |
|---|---|---|---|
| 2011/0191630 A1* | 8/2011 | Li ........................ | G06F 11/0793 714/25 |
| 2018/0062909 A1* | 3/2018 | Upshur ............... | G06F 11/0787 |
| 2019/0026663 A1* | 1/2019 | Homeyer ........... | G06Q 10/0633 |
| 2020/0310749 A1* | 10/2020 | Miller ..................... | G06F 3/167 |
| 2022/0156247 A1* | 5/2022 | Gururaj ............... | G06F 16/1734 |
| 2022/0335318 A1* | 10/2022 | Wang ................... | G06F 11/3409 |
| 2023/0419183 A1* | 12/2023 | Purdy .................... | G06N 20/20 |

* cited by examiner

*Primary Examiner* — Charles M Swift
(74) *Attorney, Agent, or Firm* — GREENBLUM & BERNSTEIN, P.L.C.

(57) ABSTRACT

A method of automatically providing a process completion information of an application process is disclosed. The method includes receiving one or more log files associated with the application process, wherein the one or more log files comprises one or more log lines; implementing a meta-data subsystem to identify one or more stages associated with the one or more log lines based on a set of pre-determined sequenced metadata information; and automatically determining and providing, via the metadata subsystem, the process completion information of the application process based on the identified one or more stages associated with the one or more log lines.

15 Claims, 6 Drawing Sheets

METHOD AND SYSTEM FOR AUTOMATICALLY PROVIDING A PROCESS COMPLETION INFORMATION OF AN APPLICATION PROCESS

CROSS-REFERENCE TO RELATED APPLICATIONS

This application claims priority benefit from Indian Application No. 202211069518, filed Dec. 1, 2022 in the India Patent Office, which is hereby incorporated by reference in its entirety.

BACKGROUND

Field of the Disclosure

This technology generally relates to methods and systems of automatic log monitoring for status prediction, and more particularly to methods and systems for automatically providing a process completion information of an application process.

Background Information

The following description of the related art is intended to provide background information pertaining to the field of the disclosure. This section may include certain aspects of the art that may be related to various features of the present disclosure. However, it should be appreciated that this section is used only to enhance the understanding of the reader with respect to the present disclosure, and not as admissions of the prior art.

Generally, when an application process is executed, log files having logs of events that occurred during the execution of the application process are generated. These logs may include details related to various events that have occurred, errors, warnings and/or informational events, etc. In general, a log file of an application may include a context information providing insight into state(s) of the application, timestamp (s) for instance for tracking and correlating issues and/or log level(s) indicating a level of importance of entries in the log file. Currently, log files are used by conventional log analyzer frameworks to analyze bugs and unexpected events. For instance, traditionally known solutions analyze log files on a post-facto basis, i.e., for troubleshooting and gathering system information. Also, presently some advancements on log analysis have been observed in the space of anomaly detection and prediction, infrastructure-level system failures/breakdown (for instance in high CPU-utilization, memory utilization, etc.). However, conventional log analyzer tools that exist have many limitations.

The limitation of using conventional log analyzer frameworks is that these conventional testing frameworks are focused only on infrastructure and alert related intelligence and fail to analyze logs to detect and provide at least a system/application process progress detail and/or a completion prediction, i.e., an estimated time of completion (ETC) of the system/application process. Therefore, there is a need for a specialized approach that can overcome at least these limitations by automatically providing a process completion information of an application process.

SUMMARY

The present disclosure, through one or more of its various aspects, embodiments, and/or specific features or sub-components, provides, inter alia, various systems, servers, devices, methods, media, programs, and platforms for automatically providing a process completion information of an application process.

According to an aspect of the present disclosure, a method for automatically providing a process completion information of an application process is disclosed. The method is implemented by at least one processor. The method may include receiving, by the at least one processor, at least one log file associated with the application process, wherein the at least one log file includes at least one log line; implementing, by the at least one processor, a metadata subsystem to identify at least one stage associated with the at least one log line based on a set of pre-determined sequenced metadata information: and automatically determining and providing, by the at least one processor via the metadata subsystem, the process completion information of the application process based on the identified at least one stage associated with the at least one log line.

In accordance with an exemplary embodiment, the set of pre-determined sequenced metadata information includes a set of pre-determined sequenced metadata stages and a log information associated with the set of pre-determined sequenced metadata stages.

In accordance with an exemplary embodiment, the implementing, by the at least one processor, the metadata subsystem includes matching the at least one log line sequentially with the set of pre-determined sequenced metadata information.

In accordance with an exemplary embodiment, the method may further include training the metadata subsystem based on: receiving, by the at least one processor, a plurality of historical log files, wherein each historical log file from the plurality of historical log files includes at least one historical log line: generating, by the at least one processor, a set of strings for each historical log line from the at least one historical log line: pre-processing, by the at least one processor, the set of strings of each historical log line from the at least one historical log line to generate a metadata for each historical log file from the plurality of historical log files; identifying, by the at least one processor, at least one historical stage in the metadata of each historical log file: determining, by the at least one processor, the set of pre-determined sequenced metadata information based at least on a consolidation of the at least one historical stage identified in the metadata of each historical log file; determining, by the at least one processor, at least one from among a time delta between the at least one historical stage present in the set of pre-determined sequenced metadata information and an expected time of completion for the at least one historical stage present in the set of pre-determined sequenced metadata information: and training, by the at least one processor, the metadata subsystem based at least on at least one from among the set of pre-determined sequenced metadata information, the time delta and the expected time of completion.

In accordance with an exemplary embodiment, each historical log file from the plurality of historical log files is associated with an end-to-end application process.

In accordance with an exemplary embodiment, the process completion information includes at least one from among a completion percentage of the application process, a current stage of the application process, and an estimated time of completion (ETC) associated with the application process.

According to an aspect of the present disclosure, a computing device configured to implement an execution of a method of automatically providing a process completion information of an application process is provided. The computing device includes a processor: a memory; and a communication interface coupled to each of the processor and the memory. The processor may be configured to: receive at least one log file associated with the application process, wherein the at least one log file includes at least one log line: implement a metadata subsystem to identify at least one stage associated with the at least one log line based on a set of pre-determined sequenced metadata information; and automatically determine and provide, via the metadata subsystem, the process completion information of the application process based on the identified at least one stage associated with the at least one log line.

In accordance with an exemplary embodiment, the set of pre-determined sequenced metadata information includes a set of pre-determined sequenced metadata stages and a log information associated with the set of pre-determined sequenced metadata stages.

In accordance with an exemplary embodiment, the processor is further configured to implement the metadata subsystem by matching the at least one log line sequentially with the set of pre-determined sequenced metadata information.

In accordance with an exemplary embodiment, the processor is further configured to train the metadata subsystem based on: receiving a plurality of historical log files, wherein each historical log file from the plurality of historical log files includes at least one historical log line: generating a set of strings for each historical log line from the at least one historical log line: pre-processing the set of strings of each historical log line from the at least one historical log lines to generate a metadata for each historical log file from the plurality of historical log files; identifying at least one historical stage in the metadata of each historical log file; determining the set of pre-determined sequenced metadata information based at least on a consolidation of the at least one historical stage identified in the metadata of each historical log file, determining at least one from among a time delta between the at least one historical stage present in the set of pre-determined sequenced metadata information and an expected time of completion for the at least one historical stage present in the set of pre-determined sequenced metadata information, and training the metadata subsystem based at least on at least one from among the set of pre-determined sequenced metadata information, the time delta and the expected time of completion.

In accordance with an exemplary embodiment, each historical log file from the plurality of historical log files is associated with an end-to-end application process.

In accordance with an exemplary embodiment, the process completion information includes at least one from among a completion percentage of the application process, a current stage of the application process, and an estimated time of completion (ETC) associated with the application process.

According to an aspect of the present disclosure, a non-transitory computer readable storage medium configured to store instructions for automatically providing a process completion information of an application process is disclosed. The instructions include executable code which, when executed, may cause a processor to: receive at least one log file associated with the application process, wherein the at least one log file includes at least one log line: implement a metadata subsystem to identify at least one stage associated with the at least one log line based on a set of pre-determined sequenced metadata information: and automatically determining and providing, via the metadata subsystem, the process completion information of the application process based on the identified at least one stage associated with the at least one log line.

In accordance with an exemplary embodiment, the set of pre-determined sequenced metadata information includes a set of pre-determined sequenced metadata stages and a log information associated with the set of pre-determined sequenced metadata stages.

In accordance with an exemplary embodiment, when executed, the executable code further causes the processor to match the at least one log line sequentially with the set of pre-determined sequenced metadata information.

In accordance with an exemplary embodiment, when executed, the executable code further causes the processor to perform the training of the metadata subsystem based on: receiving a plurality of historical log files, wherein each historical log file from the plurality of historical log files includes at least one historical log line: generating a set of strings for each historical log line from the at least one historical log line: pre-processing the set of strings of each historical log line from the at least one historical log line to generate a metadata for each historical log file from the plurality of historical log files: identifying at least one historical stage in the metadata of each historical log file: determining the set of pre-determined sequenced metadata information based at least on a consolidation of the at least one historical stage identified in the metadata of each historical log file; determining at least one from among a time delta between the at least one historical stage present in the set of pre-determined sequenced metadata information and an expected time of completion for the at least one historical stage present in the set of pre-determined sequenced metadata information: and training the metadata subsystem based at least on at least one from among the set of pre-determined sequenced metadata information, the time delta and the expected time of completion.

In accordance with an exemplary embodiment, each historical log file from the plurality of historical log files is associated with an end-to-end application process.

In accordance with an exemplary embodiment, the process completion information includes at least one from among a completion percentage of the application process, a current stage of the application process, and an estimated time of completion (ETC) associated with the application process.

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components, electronic components or circuitry commonly used to implement such components.

DETAILED DESCRIPTION

Figure 1:
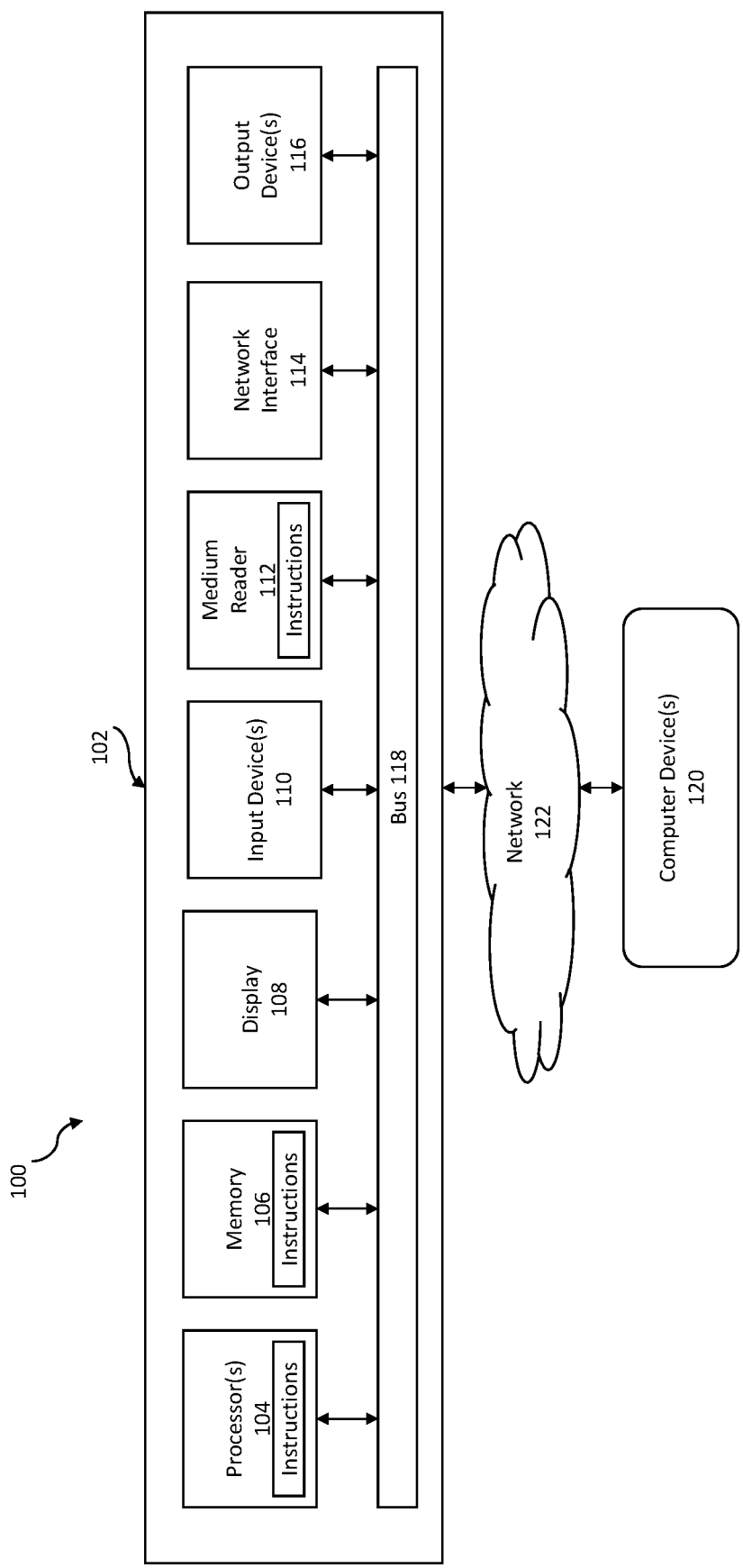
FIG. 1 illustrates an exemplary computer system for automatically providing a process completion information of an application process in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in accordance with the embodiments described herein. The system 100 is generally shown and may include a computer system 102, also known as computing device 102, which is generally indicated to automatically provide a process completion information of an application process in accordance with an exemplary embodiment.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for automatically providing a process completion information of an application process based on identified one or more stages associated with one or more log lines present in one or more log files, wherein the one or more log files are associated with the application process.

Figure 2:
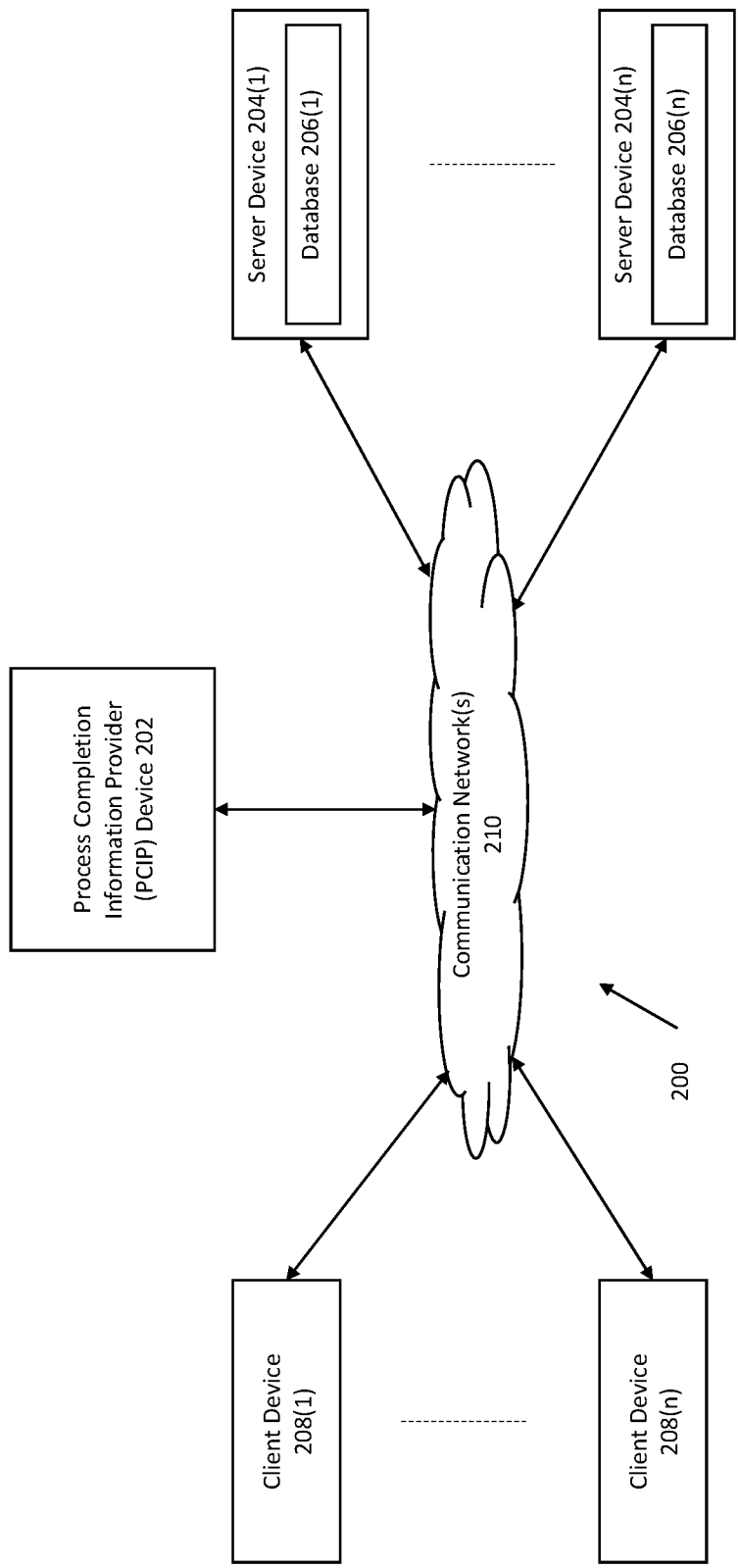
FIG. 2 illustrates an exemplary diagram of a network environment with a process completion information provider device in accordance with an exemplary embodiment.

Referring to FIG. 2, a schematic of an exemplary network environment 200 for implementing a method for automatically providing a process completion information of an application process is illustrated in accordance with an exemplary embodiment. In an exemplary embodiment, the method is executable on any networked computer platform, such as, for example, a personal computer (PC).

The method for automatically providing a process completion information of an application process may be implemented by a Process Completion Information Provider (PCIP) device 202. The PCIP device 202 may be the same or similar to the computer system 102 as described with respect to FIG. 1. The PCIP device 202 may store one or more applications that can include executable instructions that, when executed by the PCIP device 202, cause the PCIP device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the PCIP device 202 itself, may be located in virtual server(s) running in a cloud-based computing environment rather than being tied to one or more specific physical network computing devices. Also, the application(s) may be running in one or more virtual machines (VMs) executing on the PCIP device 202. Additionally, in one or more embodiments of this technology, virtual machine(s) running on the PCIP device 202 may be managed or supervised by a hypervisor.

In the network environment 200 of FIG. 2, the PCIP device 202 is coupled to a plurality of server devices 204(1)-204(n) that hosts a plurality of databases 206(1)-206(n), and also to a plurality of client devices 208(1)-208(n) via communication network(s) 210. A communication interface of the PCIP device 202, such as the network interface 114 of the computer system 102 of FIG. 1, operatively couples and communicates between the PCIP device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the PCIP device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and PCIP devices that efficiently implement a method for automatically providing a process completion information of an application process, the method being implemented by at least one processor.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The PCIP device 202 may be a standalone device or integrated with one or more other devices or apparatuses, such as one or more of the server devices 204(1)-204(n), for example. In one particular example, the PCIP device 202 may include or be hosted by one of the server devices 204(1)-204(n), and other arrangements are also possible. Moreover, one or more of the devices of the PCIP device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the PCIP device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) host the databases 206(1)-206(n) that are configured to store an information related to one or more historical log files and/or an information related to one or more new log files.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(*n*) in this example may include any type of computing device that can interact with the PCIP device 202 via communication network(s) 210. Client device in this context refers to any computing device that interfaces to communications network(s) 210 to obtain resources from one or more server devices 204(1)-204(*n*) or other client devices 208(1)-208(*n*). According to exemplary embodiments, the client devices 208(1)-208(*n*) in this example may include any type of computing device that can facilitate the implementation of the PCIP device 202 that may be configured for implementing a method of automatically providing a process completion information of an application process, but the disclosure is not limited thereto. Accordingly, the client devices 208(1)-208(*n*) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(*n*) may run interface applications, such as standard web browsers or standalone client applications, which may provide an interface to communicate with the PCIP device 202 via the communication network(s) 210 in order to communicate user requests and information. The client devices 208(1)-208(*n*) may further include, among other features, a display device, such as a display screen or touchscreen, and/or an input device, such as a key board, for example.

Although the exemplary network environment 200 with the PCIP device 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the PCIP device 202, the server devices 204(1)-204(*n*), or the client devices 208(1)-208(*n*), for example, may be configured to operate as virtual instances on the same physical machine. In other words, one or more of the PCIP device 202, the server devices 204(1)-204(*n*), or the client devices 208(1)-208(*n*) may operate on the same physical device rather than as separate devices communicating through communication network(s) 210. Additionally, there may be more or fewer PCIP devices 202, server devices 204(1)-204(*n*), or client devices 208(1)-208(*n*) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
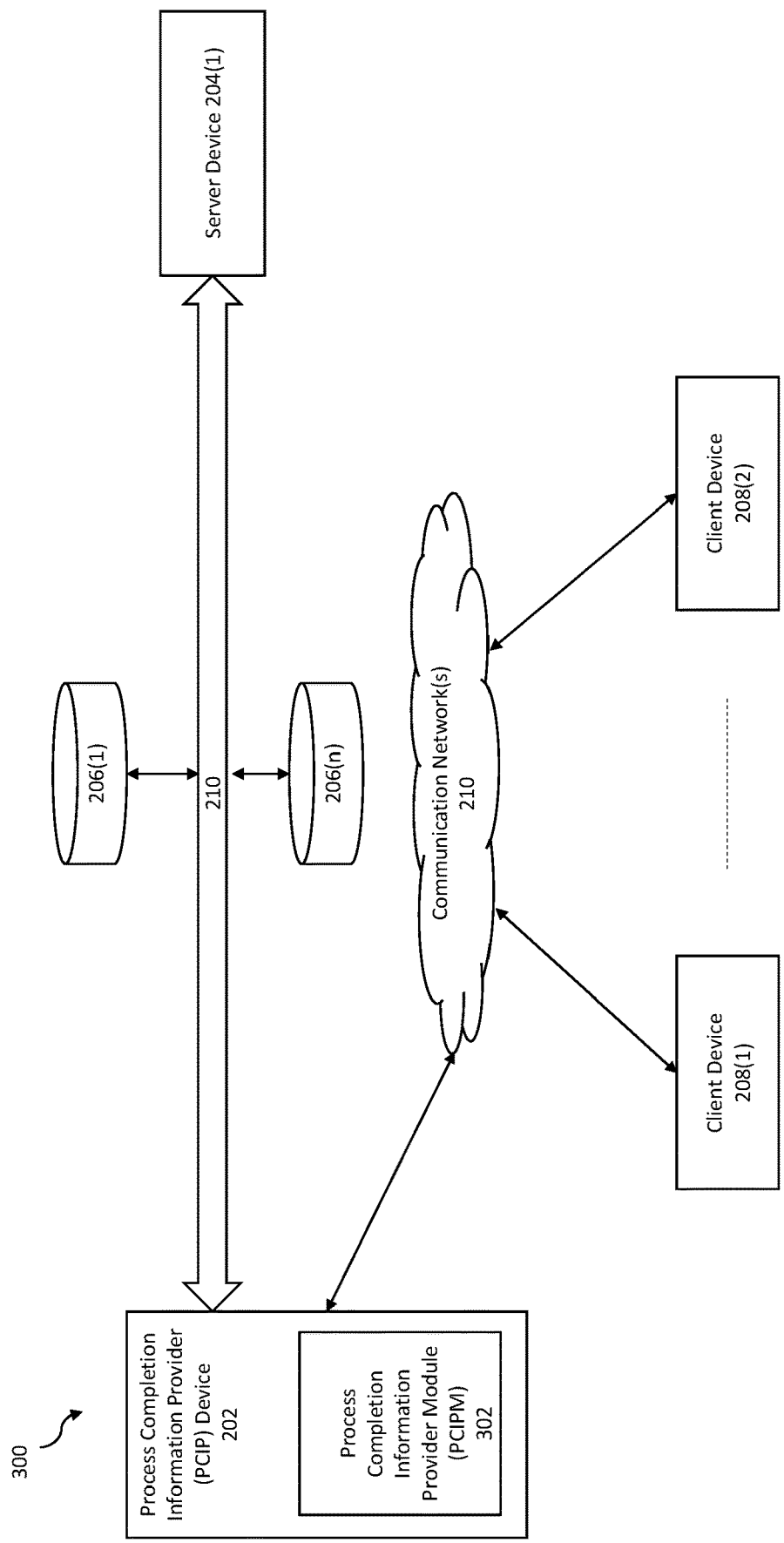
FIG. 3 illustrates an exemplary system diagram for implementing the process completion information provider device with a process completion information provider module, in accordance with an exemplary embodiment.

FIG. 3 illustrates an exemplary system for implementing a method for automatically providing a process completion information of an application process, in accordance with an exemplary embodiment. As illustrated in FIG. 3, according to exemplary embodiments, the system 300 may comprise a PCIP device 202 including a PCIP module 302 that may be connected to a server device 204(1) and one or more repository 206(1) . . . 206(*n*) via a communication network 210, but the disclosure is not limited thereto. The PCIP device 202 may also be connected to a plurality of client devices 208(1)-208(*n*) via the communication network 210, but the disclosure is not limited thereto. According to exemplary embodiments, the PCIP device 202 may be implemented within the client devices 208(1)-208(*n*), but the disclosure is not limited thereto. According to exemplary embodiments, the client devices 208(1)-208(*n*) may be utilized for implementing software application process(es) and machine learning model generations, but the disclosure is not limited thereto.

The PCIP device 202 is described and shown in FIG. 3 as including the process completion information provider (PCIP) module 302, although it may include other rules, policies, modules, databases, or applications, for example. As will be described below, the process completion information provider module 302 is configured to implement a method for automatically providing a process completion information of an application process.

An exemplary process for implementing a mechanism for automatically providing a process completion information of an application process by utilizing the network environment of FIG. 2 is shown as being executed in FIG. 3. Specifically, a first client device 208(1) and a second client device 208(2) are illustrated as being in communication with PCIP device 202. In this regard, the first client device 208(1) and the second client device 208(2) may be "clients" of the PCIP device 202 and are described herein as such. Nevertheless, it is to be known and understood that the first client device 208(1) and/or the second client device 208(2) need not necessarily be "clients" of the PCIP device 202, or any entity described in association therewith herein. Any additional or alternative relationship may exist between either or both of the first client device 208(1) and the second client device 208(2) and the PCIP device 202, or no relationship may exist.

Further, PCIP device 202 is illustrated as being able to access the one or more repositories 206(1) . . . 206(*n*). The process completion information provider module 302 may be configured to access these repositories/databases for implementing a method for automatically providing a process completion information of an application process.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the PCIP device 202 via broadband or cellular communication. Of course, these embodiments are merely exemplary and are not limiting or exhaustive.

Upon being started, the process completion information provider module 302 executes a process for automatically providing a process completion information of an application process. An exemplary system diagram for implementing the process completion information provider module of FIG. 3, to further implement the method for automatically providing the process completion information of the application process, in accordance with an exemplary embodiment is generally indicated at 400 in FIG. 4.

Figure 4:
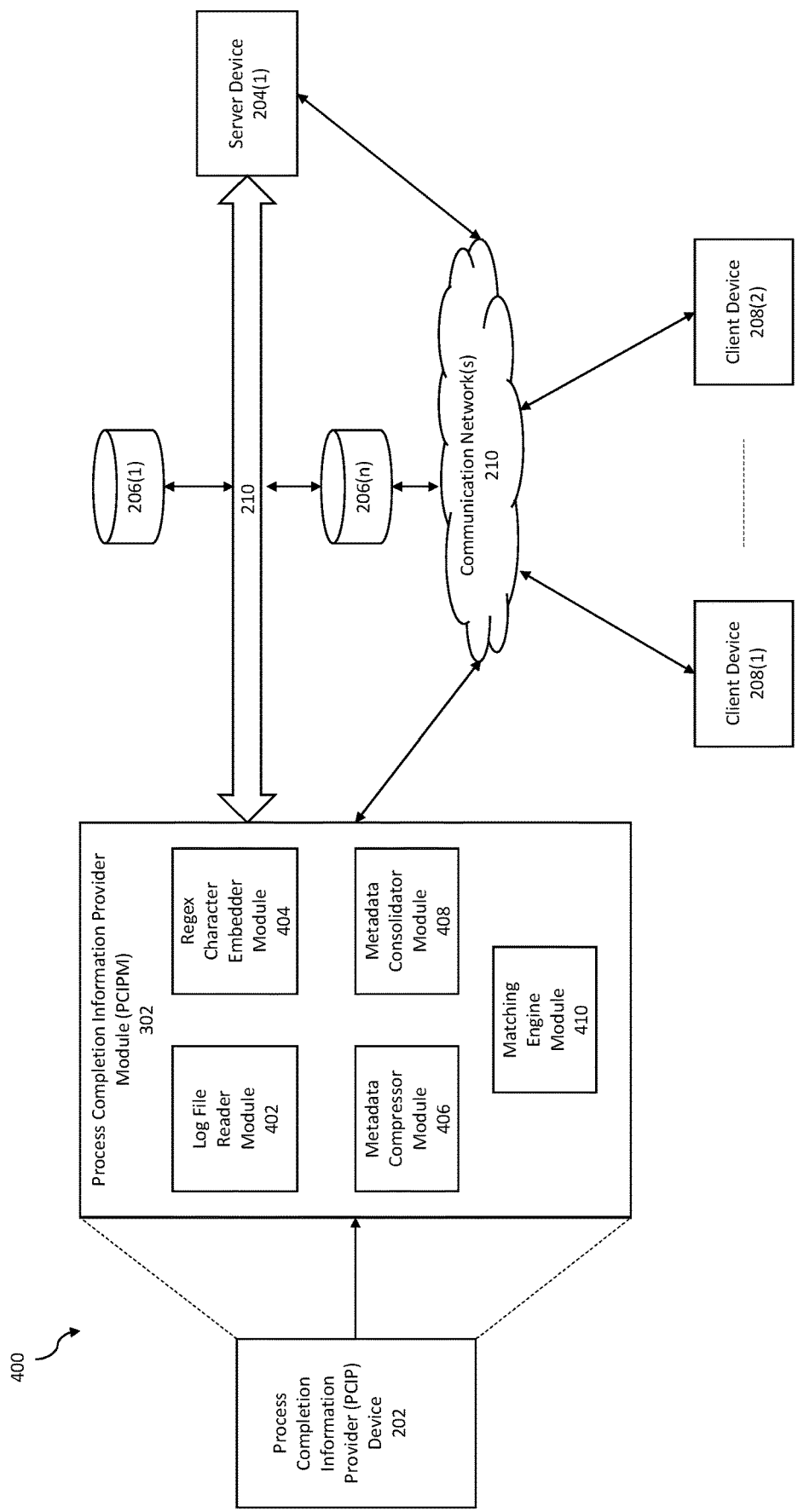
FIG. 4 illustrates a system diagram for implementing the process completion information provider module of FIG. 3, to further implement a method for automatically providing a process completion information of an application process, in accordance with an exemplary embodiment.

FIG. 4 illustrates a system diagram for implementing a process completion information provider module (PCIPM) of FIG. 3 in accordance with an exemplary embodiment.

As illustrated in FIG. 4, the system 400 may include a process completion information provider (PCIP) device 202 within which an PCIPM 302 may be embedded, databases 206(1)-206(n), a server device 204(1), client devices 208(1)-208(n), and a communication network 210.

As illustrated in FIG. 4, the PCIPM 302 may include a Log File Reader Module 402, a Regex Character Embedder Module 404, a Metadata Compressor Module 406, a Metadata Consolidator Module 408 and a Matching Engine Module 410. According to exemplary embodiments, the databases 206(1)-206(n) may be external to the PCIP device 202 may include various systems that are managed and operated by an organization. Alternatively, according to exemplary embodiments, the databases 206(1)-206(n) may be embedded within the PCIP device 202 and/or within the PCIPM 302.

According to exemplary embodiments, the PCIPM 302 may be implemented via user interfaces, e.g., web user interface, but the disclosure is not limited thereto, and may be integrated with a private cloud platform and a distributed file system platform, but the disclosure is not limited thereto.

The process may be executed via the PCIPM 302 and the communication network 210, which may comprise plural networks as described above. For example, in an exemplary embodiment, the various components of the PCIPM 302 may communicate with the server 204(1), and the databases 206(1)-206(n) via the communication network 210. Of course, these embodiments are merely exemplary and are not limiting or exhaustive.

According to exemplary embodiments, each of the Log File Reader Module 402, the Regex Character Embedder Module 404, the Metadata Compressor Module 406, the Metadata Consolidator Module 408 and the Matching Engine Module 410 may be implemented by microprocessors or similar, they may be programmed using software (e.g., microcode) to perform various functions discussed herein and may optionally be driven by firmware and/or software. Alternatively, each of the Log File Reader Module 402, the Regex Character Embedder Module 404, the Metadata Compressor Module 406, the Metadata Consolidator Module 408 and the Matching Engine Module 410 may be implemented by dedicated hardware, or as a combination of dedicated hardware to perform some functions and a processor (e.g., one or more programmed microprocessors and associated circuitry) to perform other functions. Also, according to exemplary embodiments, each of the Log File Reader Module 402, the Regex Character Embedder Module 404, the Metadata Compressor Module 406, the Metadata Consolidator Module 408 and the Matching Engine Module 410 may be physically separated into two or more interacting and discrete blocks, units, devices, and/or modules without departing from the scope of the inventive concepts.

According to exemplary embodiments, each of the Log File Reader Module 402, the Regex Character Embedder Module 404, the Metadata Compressor Module 406, the Metadata Consolidator Module 408 and the Matching Engine Module 410 may be called by corresponding API, but the disclosure is not limited thereto.

According to exemplary embodiments, the Log File Reader Module 402 may be configured to receive a plurality of historical log files. Each historical log file from the plurality of historical log files comprises one or more historical log lines, but the disclosure is not limited thereto. Also, each historical log file from the plurality of historical log files is associated with an end-to-end application process. 'An application process' of an application may be any implementation of any feature of the application and the 'end-to-end application process' may be an implementation of all the features of at least one of one or more functionalities and all functionalities of the application. Also, each 'historical log file' associated with an application process is a file of historical events that are logged for that application process during a historical time period. Also, each historical log line from the one or more historical log lines comprises an information of one or more historical events. In an exemplary embodiment, if the plurality of historical log files includes two or more rolling log files, the rollover log files may be merged to form a single historical log file such that each historical log file contains a log information and/or one or more historical log lines depicting a full (i.e., end-to-end) application process journey. In the exemplary embodiment the rollover log files may be merged to form a single historical log file, as in the given exemplary embodiment, the Log File Reader Module 402 may receive each historical log file that is tracing or capturing one or more log lines and/or log information for an entire process/control flow (i.e., for beginning stage to a last stage) of an application. Therefore, each historical log file may include log information and/or log line(s) related to a starting to an ending process for an instance/application. Also, two exemplary historical log files (i.e., Log 1 and Log 2), each comprising a plurality of log lines are depicted below in Table 1 and Table 2:

TABLE 1

(/app/general_log_21_02_2022.log) Log 1:
[00:00:00 21/02/2022] Starting Execution with Instance No. 1
[00:00:01 21/02/2022] Connecting to DB...
[00:00:05 21/02/2022] Executing Query: SELECT * FROM 'ABC'
[00:01:00 21/02/2022] Preprocessing data: Time elapsed 10 sec
[00:01:10 21/02/2022] Preprocessing data: Time elapsed 10 sec
[00:01:22 21/02/2022] Returned Response

TABLE 2

(/app/general_log_22_02_2022.log) Log 2:
[00:10:00 22/02/2022] Starting Execution with Instance No. 2
[00:10:01 22/02/2022] Connecting to DB...
[00:10:05 22/02/2022] Executing Query: SELECT * FROM 'DEF' WHERE ID=9
[00:11:00 22/02/2022] Preprocessing data: Time elapsed 10 sec
[00:11:12 22/02/2022] Returned Response According to exemplary embodiments, once the Log File Reader Module 402 receives the plurality of historical log files, the Log File Reader Module 402 then may be configured to generate a set of strings for each historical log line from the one or more historical log lines present in each historical log file. A string generated for a historical log line comprises details as encompassed in the corresponding historical log line. Also, two exemplary set of strings generated for two exemplary historical log files as indicated in Table 1 and Table 2 are depicted below in Table 3 and Table 4, respectively:

TABLE 3 historical_log_lines_for_log_1 = [
"[00:00:00 21/02/2022] Starting Execution with Instance No. 1",
"[00:00:01 21/02/2022] Connecting to DB...",
"[00:00:05 21/02/2022] Executing Query: SELECT * FROM 'ABC'",
"[00:01:00 21/02/2022] Preprocessing data: Time elapsed 10 sec",
"[00:01:10 21/02/2022] Preprocessing data: Time elapsed 10 sec",
"[00:01:22 21/02/2022] Returned Response"]

TABLE 4 historical_log_lines_for_log_2 = [
"[00:10:00 22/02/2022] Starting Execution with Instance No. 2",
"[00:10:01 22/02/2022] Connecting to DB...",
"[00:10:05 22/02/2022] Executing Query: SELECT * FROM 'DEF' WHERE ID=9",
"[00:11:00 22/02/2022] Preprocessing data: Time elapsed 10 sec",
"[00:11:12 22/02/2022] Returned Response"]

According to exemplary embodiments, the Regex Character Embedder Module 404 of the PCIPM 302 may be configured to pre-process the set of strings of each historical log line from the one or more historical logs lines to generate a metadata for each historical log file from the plurality of historical log files. According to exemplary embodiments, the Regex Character Embedder Module 404 may parse a set of strings of each historical log line and perform preprocessing to remove special characters that may or may not be regex-parser-interpretable. The preprocessing performed by the Regex Character Embedder Module 404 may also involve removal of keywords, SQL-like queries, pipes, stars, trailing characters, strings like "START", "END", "EXCEPTION", etc. Also, the Regex Character Embedder Module 404 may perform preprocessing by replacing specific numbers, strings with regex characters like/d+ and/s+ which sort of condenses a log information associated with the set of strings of the one or more historical logs lines and makes the one or more historical logs lines regex-searchable.

Also, according to exemplary embodiments the metadata for each historical log file from the plurality of historical log files may include but not limited to one or more historical stages corresponding to the one or more historical logs lines and a log information associated with the one or more historical stages corresponding to the one or more historical logs lines. The log information associated with the one or more historical stages may include a timestamp detail, but the disclosure is not limited thereto. Also, a metadata generated for two exemplary historical log files as indicated in Table 1 and Table 2 is depicted below in Table 5 and Table 6, respectively:

TABLE 5 meta_data_for_log_1 = [
{
"line": "[00:00:00 21/02/2022] Starting Execution with Instance No. 1",
"process": "Starting Execution with Instance No. \d+",
"timestamp": "00:00:00 21/02/2022"
},
{
"line": "[00:00:01 21/02/2022] Connecting to DB...",
"process": "Connecting to DB",
"timestamp": "00:00:01 21/02/2022"
},
{
"line": "[00:00:05 21/02/2022] Executing Query: SELECT * FROM 'ABC'",
"process": "Executing Query", TABLE 5-continued "timestamp": "00:00:05 21/02/2022"
},
{
"line": "[00:01:00 21/02/2022] Preprocessing data: Time elapsed 10 sec",
"process": "Preprocessing data: Time elapsed \d+ sec",
"timestamp": "00:01:00 21/02/2022"
},
{
"line": "[00:01:10 21/02/2022] Preprocessing data: Time elapsed 10 sec",
"process": "Preprocessing data: Time elapsed \d+ sec",
"timestamp": "00:01:10 21/02/2022"
},
{
"line": "[00:01:22 21/02/2022] Returned Response",
"process": "Returned Response",
"timestamp": "00:01:22 21/02/2022"
}
]

TABLE 6 meta_data_for_log_2 = [
{
"line": "[00:10:00 22/02/2022] Starting Execution with Instance No. 2",
"process": "Starting Execution with Instance No. \d+",
"timestamp": "00:10:00 22/02/2022"
},
{
"line": "[00:10:01 22/02/2022] Connecting to DB...",
"process": "Connecting to DB",
"timestamp": "00:10:01 22/02/2022"
},
{
"line": "[00:10:05 22/02/2022] Executing Query: SELECT * FROM 'DEF' WHERE ID=9",
"process": "Executing Query",
"timestamp": "00:10:05 22/02/2022"
},
{
"line": "[00:11:00 22/02/2022] Preprocessing data: Time elapsed 10 sec",
"process": "Preprocessing data: Time elapsed \d+ sec",
"timestamp": "00:11:00 22/02/2022"
},
{
"line": "[00: 11:12 22/02/2022] Returned Response",
"process": "Returned Response",
"timestamp": "00:11:12 22/02/2022"
}
]

According to exemplary embodiments, the Metadata Compressor Module 406 of PCIPM 302 may be configured to identify one or more historical stages in the metadata of each historical log file. The Metadata Compressor Module 406 may further be configured to provide the identified one or more historical stages to Metadata Consolidator Module 408 of PCIPM 302. According to exemplary embodiments, the Metadata Consolidator Module 408 is configured to determine for each historical log file, a set of pre-determined sequenced metadata information based at least on a consolidation of the one or more historical stages identified in the metadata of each historical log file. Also, the set of pre-determined sequenced metadata information comprises a set of pre-determined sequenced metadata stages and a log information associated with the set of pre-determined sequenced metadata stages. The set of pre-determined sequenced metadata stages includes the one or more historical stages arranged in a sequential manner. Also, the log information associated with the set of pre-determined sequenced metadata stages includes a timestamp detail related to the one or more historical stages arranged in a sequential manner, but the disclosure is not limited thereto.

According to exemplary embodiments, the Metadata Consolidator Module 408 is further configured to determine at least one of a time delta between the one or more historical stages present in the set of pre-determined sequenced metadata information and an expected time of completion for the one or more historical stages present in the set of pre-determined sequenced metadata information. In an exemplary implementation the expected time of completion for the one or more historical stages present in the set of pre-determined sequenced metadata information may be an average time of completion for said one or more historical stages, however the disclosure is not limited thereto and the expected time of completion for the one or more historical stages may be determined using one or more statistical techniques and/or one or more machine learning based techniques. Also, an exemplary time delta in seconds generated between historical stages of two exemplary historical log files as indicated in Table 1 and Table 2 is depicted below in Table 7:

TABLE 7

```
distinct_meta_data_for_log_1 = {
    "Starting Execution with Instance No. \d+": [82],
    "Connecting to DB": [81],
    "Executing Query": [77],
    "Preprocessing data: Time elapsed \d+ sec": [22,12],
    "Returned Response": [0]
}
distinct_meta_data_for_log_2 = {
    "Starting Execution with Instance No. \d+": [72],
    "Connecting to DB": [71],
    "Executing Query": [67],
    "Preprocessing data: Time elapsed \d+ sec": [12],
    "Returned Response": [0]
}
```

Also, an exemplary set of pre-determined sequenced metadata information determined based at least on a consolidation of the one or more historical stages identified in the metadata of two historical log files as indicated in Table 7 along with an average time of completion for one or more historical stages present in the exemplary set of pre-determined sequenced metadata information is depicted below in Table 8:

TABLE 8

```
set of pre-determined sequenced metadata information along an average
time of completion = {
    "Starting Execution with Instance No. \d+": [77],
    "Connecting to DB": [76],
    "Executing Query": [72],
    "Preprocessing data: Time elapsed \d+ sec": [17],
    "Returned Response": [0]
}
```

In the above table, "Starting Execution with Instance No. \d+" is 1st historical stage present in the exemplary set of pre-determined sequenced metadata information and [77] is the average time (i.e., the expected time) of completion for the 1st historical stage. Similarly, "Connecting to DB" is $2^{nd}$ historical stage present in the exemplary set of pre-determined sequenced metadata information and [76] is the average time of completion for the $2^{nd}$ historical stage. Also, "Executing Query" is $3^{rd}$ historical stage present in the exemplary set of pre-determined sequenced metadata information and [72] is the average time of completion for the $3^{rd}$ historical stage. Further in the Table 8 "Preprocessing data: Time elapsed \d+ sec" is $4^{th}$ historical stage present in the exemplary set of pre-determined sequenced metadata information and is the average time of completion for the $4^{th}$ historical stage. Also, in the Table 8 "Returned Response" is $5^{th}$ (i.e., last) historical stage present in the exemplary set of pre-determined sequenced metadata information and [0] is the average time of completion for the 5th historical stage.

According to exemplary embodiments, the Metadata Consolidator Module 408 is further configured to train a metadata subsystem based at least on at least one of the set of pre-determined sequenced metadata information, the time delta determined between the one or more historical stages present in the set of pre-determined sequenced metadata information and the expected time of completion of the one or more historical stages present in the set of pre-determined sequenced metadata information. Also, according to exemplary embodiments, the metadata subsystem is a metadata model that is trained to automatically determine and provide a process completion information of an application process using one or more log files associated with the application process. The process completion information of the application process comprises at least one of a completion percentage of the application process, a current stage of the application process, and an ETC associated with the application process.

According to exemplary embodiments, the Matching Engine Module 410 may be configured to receive one or more log files associated with an application process, wherein the one or more log files associated with the application process comprises one or more log lines. The Matching Engine Module 410 according to exemplary embodiments may be then configured to implement the meta-data subsystem to identify one or more stages associated with the one or more log lines based on the set of pre-determined sequenced metadata information. Also, thereafter the Matching Engine Module 410 may be configured to automatically determine and provide, via the metadata subsystem, the process completion information of the application process based on the identified one or more stages associated with the one or more log lines. Also, the process completion information of the application process may include but not limited to at least one of a completion percentage of the application process, a current stage of the application process, and an ETC associated with the application process. In an exemplary embodiment to identify the one or more stages associated with the one or more log lines the Matching Engine Module 410 is further configured to implement the meta-data subsystem by matching the one or more log lines sequentially with the set of pre-determined sequenced metadata information. For example, the Matching Engine Module 410 using the metadata subsystem, traverses from top to down the set of pre-determined sequenced metadata stages present in the set of pre-determined sequenced metadata information and uses a regex searcher to search for one or more corresponding stage in the one or more log lines. Thereafter, the Matching Engine Module 410 may obtain a last matching stage to automatically determine and provide, via the metadata subsystem, the process completion information (such as an ETC, % completion and a current stage detail) of the application process.

Also, an example where a metadata subsystem trained based on the exemplary set of pre-determined sequenced metadata information and the average time (i.e., the expected time) of completion as depicted below in Table 8 and where a new log comprising one or more log lines associated with an application process is received, is depicted below in Table 9:

TABLE 9 set of pre-determined sequenced metadata information along an average time of completion = {
 "Starting Execution with Instance No. \d+": [77],
 "Connecting to DB": [76],
 "Executing Query": [72],
 "Preprocessing data: Time elapsed \d+ sec": [17],
 "Returned Response": [0]
}
New log:
[00:00:00 21/02/2022] Starting Execution with Instance No. 1
[00:00:01 21/02/2022] Connecting to DB...
[00:00:05 21/02/2022] Executing Query: SELECT * FROM 'ABC'

In the above example, the Matching Engine Module 410 may implement the meta-data subsystem to identify stages associated with the log lines present in the received new log based on the set of pre-determined sequenced metadata information. More particularly, the Matching Engine Module 410 may identify "Executing Query" [i.e. stage number 3] as a last matching stage/current stage in the received new log based on successfully searching and identifying a first, second and third stages for the log lines present in the received new log using regex search. The Matching Engine Module 410 then may automatically determine and provide a process completion information of an application associated with the new log based on the identified stage. For instance, the Matching Engine Module 410 may determine and provide the following process completion information:

ETC=72 sec [i.e. Average-Timedelta/ETC corresponding to stage 3]

% Completion=(3/5)×100%=60% [i.e. last matching stage is stage 3 and total stages are 5]

It is pertinent to note that in the above example the average time of completion is the expected time of completion, however the present disclosure is not limited thereto and the expected time of completion may be determined using one or more statistical techniques and/or one or more machine learning based techniques.

Figure 5:
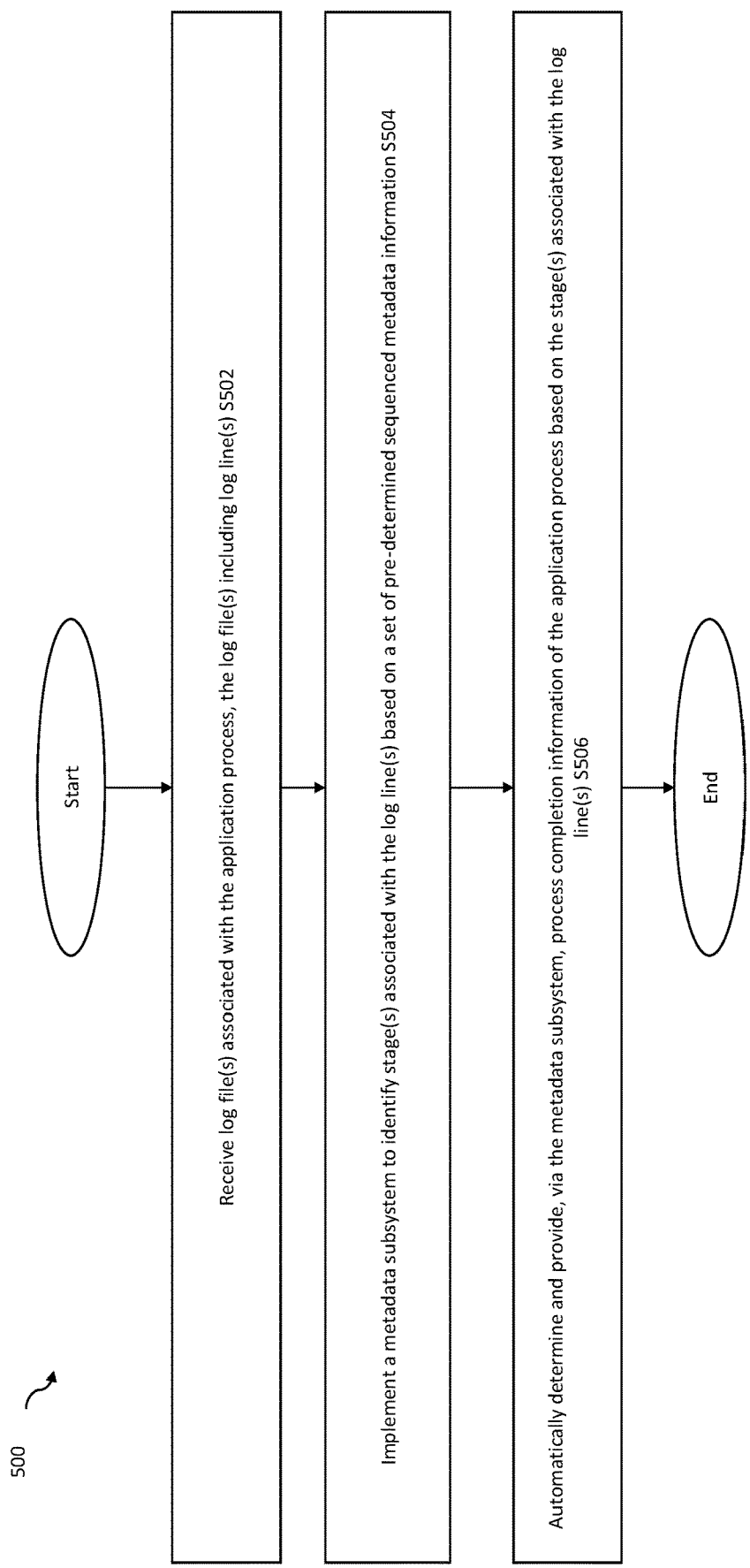
FIG. 5 illustrates a flowchart of an exemplary process for implementing a method for automatically providing a process completion information of an application process, in accordance with an exemplary embodiment.

FIG. 5 illustrates a flowchart of an exemplary process for implementing a method for automatically providing a process completion information of an application process, in accordance with an exemplary embodiment. In the process 500 of FIG. 5, at step S502, the process begins when at least one processor receives one or more log files associated with the application process, wherein the one or more log files comprises one or more log lines.

At step S504, the process 500 may implement a metadata subsystem, by the at least one processor, to identify one or more stages associated with the one or more log lines based on a set of pre-determined sequenced metadata information. The set of pre-determined sequenced metadata information may include a set of pre-determined sequenced metadata stages and a log information associated with the set of pre-determined sequenced metadata stages, but the disclosure is not limited thereto.

According to exemplary embodiments, the implementing, by the at least one processor, the metadata subsystem comprises matching the one or more log lines sequentially with the set of pre-determined sequenced metadata information.

At step S506, the process 500 may automatically determine and provide, by the at least one processor via the metadata subsystem, the process completion information of the application process based on the identified one or more stages associated with the one or more log lines. According to exemplary embodiments, the process completion information comprises at least one of a completion percentage of the application process, a current stage of the application process, and an ETC associated with the application process.

Figure 6:
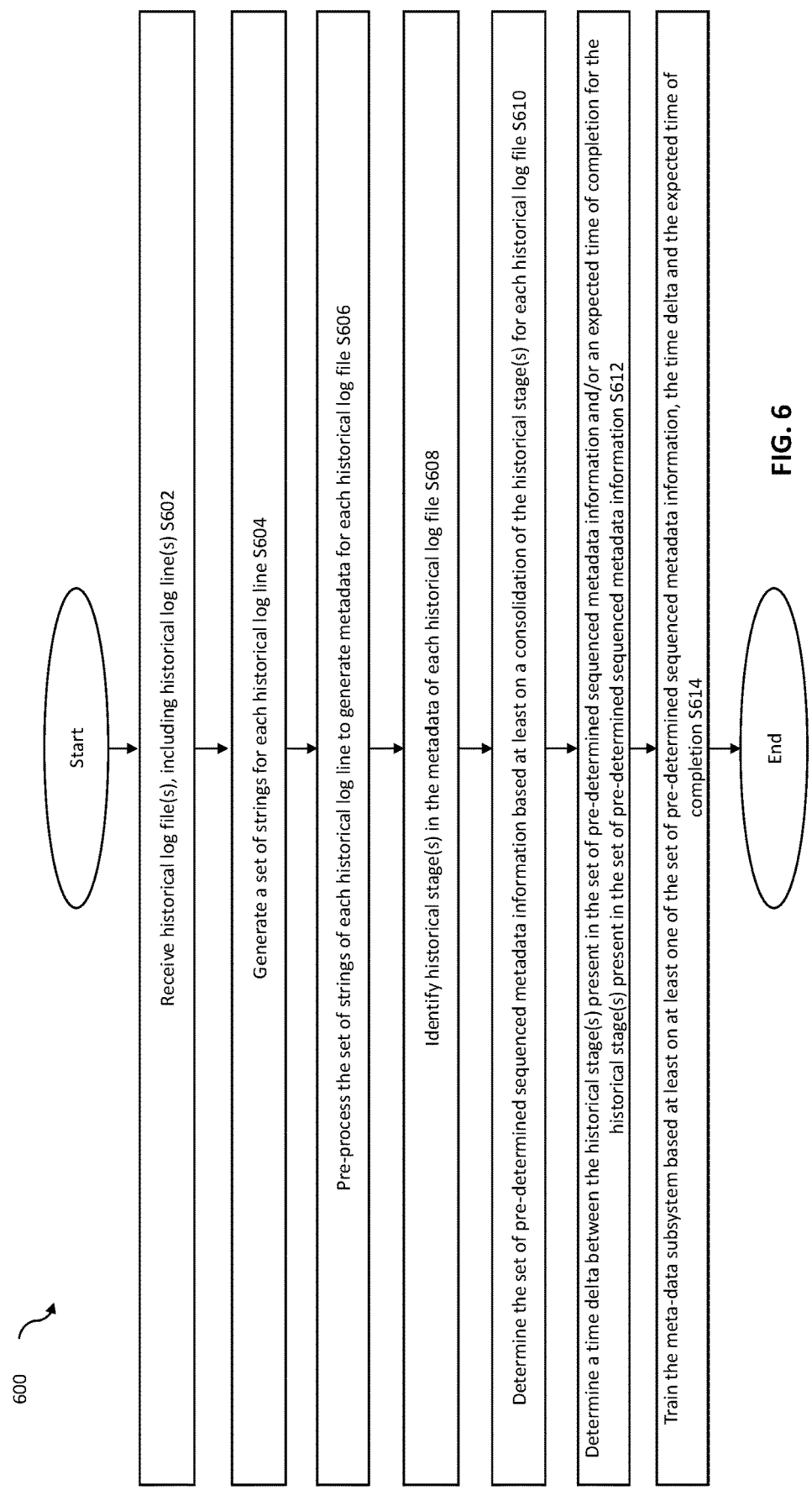
FIG. 6 illustrates a flowchart of an exemplary process for training a metadata subsystem, in accordance with an exemplary embodiment.

According to exemplary embodiments, the process 500 may further include a process of training the metadata subsystem as depicted in FIG. 6, in accordance with an exemplary embodiment. More particularly the process 600 of training the metadata subsystem includes training the meta-data subsystem based on: receiving, by the at least one processor, a plurality of historical log files at step S602, wherein each historical log file from the plurality of historical log files comprises one or more historical log lines. Next at step S604 the process 600 leads to generating, by the at least one processor, a set of strings for each historical log line from the one or more historical log lines. Thereafter at step S606 the process 600 encompasses pre-processing, by the at least one processor, the set of strings of each historical log line from the one or more historical logs lines to generate a metadata for each historical log file from the plurality of historical log files. Further the process 600 at step S608 comprises identifying, by the at least one processor, one or more historical stages in the metadata of each historical log file: After identifying the one or more historical stages in the metadata of each historical log file the process 600 at step S610 comprises determining, by the at least one processor, the set of pre-determined sequenced metadata information based at least on a consolidation of the one or more historical stages identified in the metadata of each historical log file. Next at step S612 the process 600 leads to determining, by the at least one processor, at least one of a time delta between the one or more historical stages present in the set of pre-determined sequenced metadata information and an expected time of completion for the one or more historical stages present in the set of pre-determined sequenced metadata information. Thereafter at step S614 the process 600 encompasses training, by the at least one processor, the meta-data subsystem based at least on at least one of the set of pre-determined sequenced metadata information, the time delta and the expected time of completion.

According to exemplary embodiments, each historical log file from the plurality of historical log files is associated with an end-to-end application process.

According to exemplary embodiments, the PCIP device 202 may include a memory (e.g., a memory 106 as illustrated in FIG. 1) which may be a non-transitory computer readable storage medium that may be configured to store instructions for implementing the PCIPM 302 for automatically providing a process completion information of an application process as disclosed herein. The PCIP device 202 may also include a medium reader (e.g., a medium reader 112 as illustrated in FIG. 1) which may be configured to read any one or more sets of instructions, e.g., software, from any of the memories described herein. The instructions, when executed by a processor embedded within the PCIPM 302 or within the PCIP device 202, may be used to perform one or more of the methods and processes as described herein. In a particular embodiment, the instructions may reside completely, or at least partially, within the memory 106, the medium reader 112, and/or the processor 104 (see FIG. 1) during execution by the PCIP device 202.

For example, the instructions, when executed, may cause the processor 104 to perform the following: receiving, one or more log files associated with the application process, wherein the one or more log files comprises one or more log lines: implementing, a meta-data subsystem to identify one or more stages associated with the one or more log lines based on a set of pre-determined sequenced metadata information, wherein the set of pre-determined sequenced metadata information comprises a set of pre-determined sequenced metadata stages and a log information associated with the set of pre-determined sequenced metadata stages: and automatically determining and providing, via the meta data subsystem, the process completion information of the application process based on the identified one or more stages associated with the one or more log lines, wherein the process completion information comprises at least one of a completion percentage of the application process, a current stage of the application process, and an ETC associated with the application process.

According to exemplary embodiments, for implementing the metadata subsystem, when executed, the instructions further cause the processor to perform the following: matching the one or more log lines sequentially with the set of pre-determined sequenced metadata information.

According to exemplary embodiments, when executed, the instructions cause the processor to perform the training of the metadata subsystem based on receiving, a plurality of historical log files, wherein each historical log file from the plurality of historical log files comprises one or more historical log lines and each historical log file from the plurality of historical log files is associated with an end to end application process: generating, a set of strings for each historical log line from the one or more historical log lines: pre-processing, the set of strings of each historical log line from the one or more historical logs lines to generate a metadata for each historical log file from the plurality of historical log files: identifying, one or more historical stages in the metadata of each historical log file: determining, the set of pre-determined sequenced metadata information based at least on a consolidation of the one or more historical stages identified in the metadata of each historical log file; determining, at least one of a time delta between the one or more historical stages present in the set of pre-determined sequenced metadata information and an expected time of completion for the one or more historical stages present in the set of pre-determined sequenced metadata information; and training, the meta-data subsystem based at least on at least one of the set of pre-determined sequenced metadata information, the time delta and the expected time of completion.

According to exemplary embodiments, a use case of the technical solution as disclosed in the instant disclosure is provided as below:

In order to provide a process completion information of an application process of an Application, firstly a user interface may be provided. Thereafter an application name to which a reconciliation belongs for which the process completion information is to be provided is selected via the user interface. Once the "Application Name" is selected a "REC Name" textbox may be provided on the user interface. Upon starting typing initial letters of a reconciliation (REC) in the "REC Name" textbox, a list of RECs in an autocomplete dropdown is provided on the user interface. In case the REC is not found in the dropdown, the REC is not present in the running REC list as it may be completed. According to exemplary embodiments a user may refresh the user interface after a particular time period say for example after 30 seconds.

Further, in the above use case upon selection of the "REC Name" a "Get ETC Report" button may get activated on the user interface. A user selection may then receive on the activated button and initially it may take a few minute's time (say for e.g. 5 minutes) depending upon a size and count of REC logs available for ETC derivation, to provide the process completion information. In case the "Get ETC Report" button is selected again then the process completion information may be provided in very less time as the initial call may onboard the training logs and generate meta-data and then do matching but later calls may use the already calculated meta-data. According to exemplary embodiments, in the given use case the user interface may be refreshed to update "REC Name" list as well as clear previous state. Since meta-data may be stored globally on a server a response time is not lost therefore, refreshing the user interface frequently does not provide any adverse impact. Also, the process completion information may show a Completion percentage, ETC, Current Stage which is in progress and a complete list of all the previously completed stages and forthcoming pending stages associated with the application process.

According to exemplary embodiments, in the above use case an alert-box may pop up when a server is down which may be due to excessive traffic, maintenance shutdown, app crash, etc. Also, according to exemplary embodiments the alert-box may also pop up when there are insufficient historical logs to predict an ETC of an application process and other metrics or an REC has been completed and removed from a running rec list. Also, according to exemplary embodiments, if an ETC of an application process remains constant for a very long time i.e. much more time than the ETC being projected, then there may be a high probability that a REC corresponding to the application process may be paused due to some issue.

According to exemplary embodiments as disclosed above in FIGS. 1-5, technical improvements effected by the instant disclosure may include platforms for automatically exploring and identifying existing stages in an application process captured by its logs. Also, according to exemplary embodiments the solution as disclosed in the instant disclosure may provide a technical improvement by providing a unique combination of actionable insights by parsing raw logs of an application, and/or by providing an intelligent way of forecasting ETC associated with an application process based on a metadata model. Furthermore, according to exemplary embodiments the solution as disclosed in the instant disclosure may include platforms for automatically providing a process completion information of an application process, but the disclosure is not limited thereto. For example, according to exemplary embodiments as disclosed above in FIGS. 1-6, technical improvements effected by the instant disclosure may also include platforms for automatically providing at least one of a completion percentage of the application process, a current stage of the application process, and an ETC associated with the application process, but the disclosure is not limited thereto. The solution as disclosed in the instant disclosure also overcomes the limitations of the conventional solutions at least by exploring and identifying existing stages of an application in a generic way including process percentage completion, current stage and forecast ETC from new log files by using a metadata model generated from historical log files. More specifically, the solution as disclosed in the instant disclosure allows users to get an ETC report with ETC, Completion percentage, Current Running Stage and a complete list of all completed and pending stages for a particular reconciliation. The present technical solution is so generalized that it is usable with all kind of reconciliations having different logging strategies. This solution uses a reconciliations' previous logs to train itself and generate metadata which is further used for matching with the current running log and estimate completion time and percentage.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The terms "computer-readable medium" and/or "computer-readable storage medium" shall also include any storage medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of automatically providing a process completion information of an application process, the method being implemented by at least one processor, the method comprising:

receiving, by the at least one processor, at least one log file associated with the application process, wherein the at least one log file comprises at least one log line;

implementing, by the at least one processor, a metadata subsystem to identify at least one stage associated with the at least one log line based on a set of pre-determined sequenced metadata information; and automatically determining and providing, by the at least one processor via the metadata subsystem, the process completion information of the application process based on the identified at least one stage associated with the at least one log line, wherein the method further comprises training the metadata subsystem based on:
- receiving, by the at least one processor, a plurality of historical log files, wherein each historical log file from the plurality of historical log files comprises at least one historical log line,
- generating, by the at least one processor, a set of strings for each historical log line from the at least one historical log line,
- pre-processing, by the at least one processor, the set of strings of each historical log line from the at least one historical log lines to generate a metadata for each historical log file from the plurality of historical log files,
- identifying, by the at least one processor, at least one historical stage in the metadata of each historical log file,
- determining, by the at least one processor, the set of pre-determined sequenced metadata information based at least on a consolidation of the at least one historical stage identified in the metadata of each historical log file,
- determining, by the at least one processor, at least one from among a time delta between the at least one historical stage present in the set of pre-determined sequenced metadata information and an expected time of completion for the at least one historical stage present in the set of pre-determined sequenced metadata information, and
- training, by the at least one processor, the metadata subsystem based at least on at least one from among the set of pre-determined sequenced metadata information, the time delta and the expected time of completion.

2. The method according to claim 1, wherein the set of pre-determined sequenced metadata information comprises a set of pre-determined sequenced metadata stages and a log information associated with the set of pre-determined sequenced metadata stages.

3. The method according to claim 1, wherein the implementing the metadata subsystem comprises matching the at least one log line sequentially with the set of pre- determined sequenced metadata information.

4. The method according to claim 1, wherein each historical log file from the plurality of historical log files is associated with an end-to-end application process.

5. The method according to claim 1, wherein the process completion information comprises at least one from among a completion percentage of the application process, a current stage of the application process, and an estimated time of completion (ETC) associated with the application process.

6. A computing device configured to implement an execution of a method of automatically providing a process completion information of an application process, the computing device comprising:
- a processor;
- a memory; and
- a communication interface coupled to each of the processor and the memory, wherein the processor is configured to:
  - receive at least one log file associated with the application process, wherein the at least one log file comprises at least one log line,
  - implement a metadata subsystem to identify at least one stage associated with the at least one log line based on a set of pre-determined sequenced metadata information, and
  - automatically determine and provide, via the metadata subsystem, the process completion information of the application process based on the identified at least one stage associated with the at least one log line, wherein the processor is further configured to train the metadata subsystem based on:
- receiving a plurality of historical log files, wherein each historical log file from the plurality of historical log files comprises at least one historical log line,
- generating a set of strings for each historical log line from the at least one historical log line,
- pre-processing the set of strings of each historical log line from the at least one historical log line to generate a metadata for each historical log file from the plurality of historical log files,
- identifying at least one historical stage in the metadata of each historical log file, determining the set of pre-determined sequenced metadata information based at least on a consolidation of the at least one historical stage identified in the metadata of each historical log file,
- determining at least one from among a time delta between the at least one historical stage present in the set of pre-determined sequenced metadata information and an expected time of completion for the at least one historical stage present in the set of pre-determined sequenced metadata information, and
- training the metadata subsystem based at least on at least one from among the set of pre-determined sequenced metadata information, the time delta and the expected time of completion.

7. The computing device according to claim 6, wherein the set of pre- determined sequenced metadata information comprises a set of pre-determined sequenced metadata stages and a log information associated with the set of pre-determined sequenced metadata stages.

8. The computing device according to claim 6, wherein the processor is further configured to implement the metadata subsystem by matching the at least one log line sequentially with the set of pre-determined sequenced metadata information.

9. The computing device according to claim 6, wherein each historical log file from the plurality of historical log files is associated with an end-to-end application process.

10. The computing device according to claim 6, wherein the process completion information comprises at least one from among a completion percentage of the application process, a current stage of the application process, and an estimated time of completion (ETC) associated with the application process.

11. A non-transitory computer readable storage medium configured to store instructions for automatically providing a process completion information of an application process, the instructions comprising executable code which, when executed by a processor, causes the processor to:
- receive at least one log file associated with the application process, wherein the at least one log file comprises at least one log line;

implement a metadata subsystem to identify at least one stage associated with the at least one log line based on a set of pre-determined sequenced metadata information; and automatically determine and provide, via the metadata subsystem, the process completion information of the application process based on the identified at least one stage associated with the at least one log line, wherein when executed, the executable code further causes the processor to train the metadata subsystem by:

receiving a plurality of historical log files, wherein each historical log file from the plurality of historical log files comprises at least one historical log line;

generating a set of strings for each historical log line from the at least one historical log line;

pre-processing the set of strings of each historical log line from the at least one historical log line to generate a metadata for each historical log file from the plurality of historical log files;

identifying at least one historical stage in the metadata of each historical log file;

determining, the set of pre-determined sequenced metadata information based at least on a consolidation of the at least one historical stage identified in the metadata of each historical log file;

determining at least one from among a time delta between the at least one historical stage present in the set of pre-determined sequenced metadata information and an expected time of completion for the at least one historical stage present in the set of pre-determined sequenced metadata information; and training the metadata subsystem based at least on at least one from among the set of pre-determined sequenced metadata information, the time delta and the expected time of completion.

12. The non-transitory computer readable storage medium according to claim 11, wherein the set of pre-determined sequenced metadata information comprises a set of pre-determined sequenced metadata stages and a log information associated with the set of pre-determined sequenced metadata stages.

13. The non-transitory computer readable storage medium according to claim 11, wherein when executed, the executable code further causes the processor to match the at least one log line sequentially with the set of pre-determined sequenced metadata information.

14. The non-transitory computer readable storage medium according to claim 11, wherein each historical log file from the plurality of historical log files is associated with an end-to-end application process.

15. The non-transitory computer readable storage medium according to claim 11, wherein the process completion information comprises at least one from among a completion percentage of the application process, a current stage of the application process, and an estimated time of completion (ETC) associated with the application process.

* * * * *